United States Patent [19]

Phelan et al.

[11] Patent Number: 5,481,253

[45] Date of Patent: Jan. 2, 1996

[54] AUTOMOTIVE SECURITY SYSTEM

[76] Inventors: Michael D. Phelan, 100 Eagle Nest, Irving, Tex. 75063; Keith N. St. John, 2006 Sunset Ct. N., League City, Tex. 77573

[21] Appl. No.: 264,622

[22] Filed: Jun. 23, 1994

Related U.S. Application Data

[63] Continuation of Ser. No. 838,066, Feb. 18, 1992, abandoned.

[51] Int. Cl.⁶ .................................................. B60R 25/04
[52] U.S. Cl. ..................... 340/825.31; 307/10.2; 307/10.4; 307/10.6
[58] Field of Search ..................... 340/825.31, 825.32, 340/825.56; 307/10.2–10.4, 10.6; 361/172

[56] References Cited

U.S. PATENT DOCUMENTS

| | | | |
|---|---|---|---|
| 3,059,070 | 10/1962 | Noregaard | 200/46 |
| 3,187,334 | 6/1965 | Humphrey | 346/34 |
| 3,520,161 | 7/1970 | Jacobi | 70/387 |
| 3,644,745 | 2/1972 | Bell | 307/10 |
| 3,651,464 | 3/1972 | Hedin et al. | |
| 3,660,624 | 5/1972 | Bell | 200/44 |
| 3,757,305 | 9/1973 | Hedin . | |
| 3,796,889 | 3/1974 | Fradkin et al. | 307/10.4 |
| 3,870,895 | 3/1975 | Lax et al. | 307/10 |
| 4,148,372 | 4/1979 | Schroeder | 180/114 |
| 4,150,731 | 4/1979 | Tannenbaum | 180/272 |
| 4,222,034 | 9/1980 | Orenzow . | |
| 4,296,402 | 10/1981 | Szczepanski . | |
| 4,335,370 | 6/1982 | Scalley et al. | 340/825.56 |
| 4,347,545 | 8/1982 | Weishaupt et al. | 361/172 |
| 4,379,966 | 4/1983 | Flies | 235/487 |
| 4,390,758 | 6/1983 | Hendrickson | 200/43 |
| 4,436,993 | 3/1984 | Flies | 235/382 |
| 4,438,426 | 3/1984 | Adkins . | |
| 4,533,016 | 8/1985 | Betton | 307/10.4 |
| 4,555,619 | 11/1985 | Anderson | 235/492 |
| 4,565,922 | 1/1986 | Anderson | 235/492 |
| 4,578,573 | 3/1986 | Flies et al. | 235/492 |
| 4,645,939 | 2/1987 | Robinson | 340/576 |
| 4,659,915 | 4/1987 | Flies | 235/441 |
| 4,682,062 | 7/1987 | Weinberger | 307/10.4 |
| 4,686,358 | 8/1987 | Seckinger et al. | 235/382 |
| 4,733,638 | 3/1988 | Anderson | 340/426 |
| 4,842,093 | 6/1989 | Lerche et al. | 307/10.3 |
| 4,965,460 | 10/1990 | Tanaka et al. | 307/10.4 |
| 4,993,627 | 2/1991 | Phelan et al. | 234/382 |
| 5,006,843 | 4/1991 | Hauer | 307/10.4 |
| 5,079,435 | 1/1992 | Tanaka | 307/10.4 |
| 5,109,221 | 4/1992 | Lambropoulos et al. | 340/825.31 |

*Primary Examiner*—Michael Horabik
*Attorney, Agent, or Firm*—Marc A. Hubbard

[57] ABSTRACT

An anti-theft system for an automobile includes a microprocessor-based control module that enables operation of solenoids for the power circuits of the car only if a proper identification code is entered by a data entry device and the automobile's ignition switch is sequenced through its positions. The anti-theft device further includes operating a serial switch placed in a critical electrical circuit for the engine, and data communications capability with electronic controls for the engine and other systems on the automobile so as to limit or to disable their function.

21 Claims, 4 Drawing Sheets

AUTOMOTIVE SECURITY SYSTEM

This application is a continuation of Ser. No. 838,066, filed Feb. 18, 1992, now abandoned.

FIELD OF THE INVENTION

The invention pertains generally to security systems for automobiles.

BACKGROUND OF THE INVENTION

It has been reported that one in every one hundred and twenty one cars is stolen in America every year, which is equivalent to one theft every twenty eight seconds. This represents an eight billion dollar loss. Despite increased effort from law enforcement agencies and a flood of intricate anti-theft security systems for automobiles, theft of automobiles continues to grow. Thieves are armed with slim-jims, slide hammers and screwdrivers, making steering wheel locks and other after market security systems simply minor nuisances. Thieves can make their entry and drive away in less than thirty seconds. Law enforcement authorities have indicated that there is a growing number of underground specialists who have turned their knowledge of locksmithing skills with precision tools into some of the most efficient auto theft rings ever.

Many current alarm systems utilize audible alarms for the purpose of drawing attention to an act of theft, these types of alarm systems are not effective anti-theft deterrents. With only one in thirty alarms being legitimate, typically, the alarms are ignored by most people. In fact, many local governments are considering horn nuisance laws prohibiting the use of such alarm systems.

One answer to this problem has been "post-theft retrieval systems". These systems generally allow a law-enforcement agency to track a specially equipped vehicle after they have been notified that the vehicle has been stolen. There are two problems with this kind of system, however. First, it requires participation by the police department or law enforcement agency. Second, it takes longer to discover that a car is missing, notify the police department, and track down the car than it does to strip it, which takes an average of only twelve minutes.

SUMMARY OF THE INVENTION

The invention is an anti-theft system, particularly suited for automobiles but applicable to other structures and areas secured by key locks, that provides an effective, reliable and affordable means of preventing a thief from driving away with a car, or entering the secured area, with or without the use of an audible alarm.

A theft system according to the present invention includes a data entry device for entering a secret code and a control module that is inserted between an automobile's ignition switch and its solenoids that provides power to the car's electrical circuits. The controller actuates the solenoids, and thereby allows operation of the automobile, only if a correct identification number is entered into the data entry device and the ignition key lock goes through the proper start-up sequence. Tampering with the key-pad or bypassing the ignition lock results in the controller shutting down the auto's electrical system. The design and location of the controller, as well as the design of a wiring harness connecting the controller to the solenoids, makes bypassing the system a grueling and time prohibitive process.

In accordance with other aspects of the invention, the invention may be provided with a serial switch that is placed in any critical automotive circuit. When the key ignition switch is properly sequenced and a proper code is entered into the data entry device, the serial switch is enabled, completing the critical circuit and allowing its operation.

In accordance with still further aspects of the invention, alternate codes can be recognized by the data entry device that could be used to restrict automobile performance, such as its speed, distance or time, for valet attendants or juveniles.

DETAILED DESCRIPTION OF THE DRAWINGS

U.S. Pat. No. 4,993,627, dated Feb. 19, 1991 and issued to Michael D. Phelan and Keith N. St. John, is hereby incorporated herein by reference.

Figure 1:
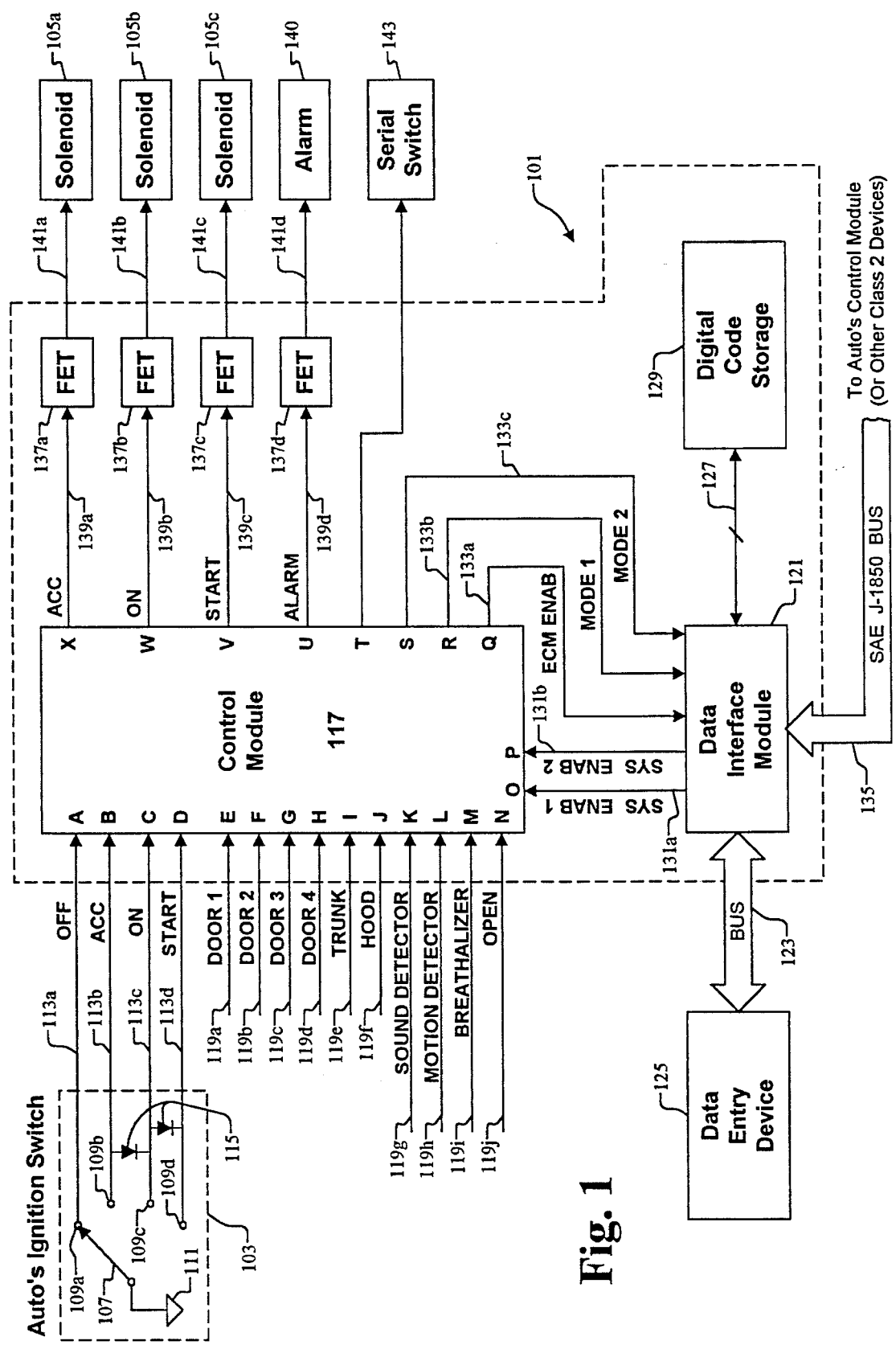
FIG. 1 is a block schematic diagram of an automobile security system in accordance with the invention.

FIG. 1 is a functional schematic of a microprocessor-based implementation of the invention, illustrating the invention and various aspects of it in its preferred embodiment. An electronic control unit 101 is coupled between an automobile's ignition switch 103 and its solenoid circuits 105a–105c. The solenoid circuits are like those found in automobiles of all makes, well-known in the art that connect power to the engine and other electrical components in the automobile. The particular automobile ignition switch 101 depicted is intended to be representative of automobile ignition switches generally. The automobile ignition switch 101 is usually mounted on or near a floor board (not shown) of an automobile, where its steering column passes through the floor board. When a driver turns a key inserted into a key lock (not shown) on the steering column through its positions, a rod extending through the column and to the auto ignition switch 103 is pushed. The motion of the rod moves the switch's arm 107 between the contacts 109a–109d, one contact for each position in a sequence of positions of the switch, hereinafter referred to as a "start-up sequence": "OFF", contact 109a; "ACC", contact 109b; "ON", contact 109c; and "START", contact 109d. These contacts are connected to, respectively, "OFF" line 113a, "ACC" line 113b, "ON" line 113c, and "START" line 113d. The arm 107 forms a direct path to ground 111 for one of lines 113a–113d when coupled to the arm through the respective contact 109a–109d. Normally, lines 113a–113d float at a positive voltage, determined by voltage pull up circuits (not shown) that are part of an interface for the electronic control unit 101. When connected to ground 111, the lines are pulled to below a logic low voltage, near ground, representing an asserted or "on" state.

Except for the OFF position, once a position is turned "on" or asserted by connecting its corresponding line to ground, it remains "on" or asserted. This is functionally illustrated by diodes 115 that provide a biased current path between adjacent lines in the direction of the latest asserted position. Therefore, ACC line 113b remains asserted, near ground level, when the switch arm is at ON contact 109c or the START contact 109d; and ON line 113c remains asserted, near ground level, when at the START contact 109d.

Control module 117, part of electronic control unit 101, includes processing circuitry (not shown) that receive and/or transmit logic signals through to a plurality of input/output ports A–Z to its interface circuitry (not shown). Generally, to turn the port "on", the voltage at the port is forced to a logic low level, either by the processing circuitry or by a line coupled to the port, depending on if the port sends or receives a logic signal.

The processing circuits are preferably implemented using a programmed microprocessor or microcontroller, coupled with memory for data and program storage. The memory may be located on the microprocessor or microcontroller chip. The programming of the functions of the control module is a straightforward task, well within the ordinary skill of those in the art. Dedicated circuitry may, however, also be used. Because the high frequency oscillators in microprocessors and microcontrollers can generate noise that interferes with the operation of some of an automobile's electronic circuits, the microprocessor should be of a low noise type, one that is specially designed for automotive use. Or, it should be packaged to reduce the effects of the noise that is generated. The control module 117 includes whatever interface circuits are necessary to condition and buffer signals between the processing circuitry and the circuits to which the input/output ports are coupled.

Ports A–D of control module 117 are coupled, respectively, to lines 113a–113e from the auto ignition switch for receiving the logic low signals from the auto ignition switch for indicating the position of the switch. Coupled to ports E–N are input lines 119a–119j from detectors associated with various components or systems of the automobile. These detectors sense, respectively, the opening of car doors 1 through 4, the trunk and the hood, and the sound and/or motion that accompanies theft attempts (e.g. the sound of breaking glass). Once the condition is sensed, the detector asserts an "on" signal on its line to turn its port on. These types of detectors are well known in the art, and many, such as those for the doors, trunk and hood are usually original equipment on automobiles. Furthermore, port M is shown to be connected to a safety device, such as a "breathalizer" for measuring blood alcohol levels, to disable the car in the event the driver should not operate the automobile. Port N is left open so that other detectors may be coupled to the control unit.

Ports O to T are coupled to a data interface module 121. Data interface module includes communications circuitry that enable serial and parallel data communications along buses with other data devices. Data interface module is shown coupled to a bus 123 that communicates data entered by a driver using data entry device 125. The data entry device is an apparatus that receives in any manner a code from a driver of an automobile, such as a keypad for manually entering a personal identification code; a magnetic or electronic reader for reading the personal identification code from a magnetic strip on the back of a plastic card or from a microelectronic device; a radio frequency or infrared receiver transmitter for receiving an encoded signal transmitted by a remote device carded by the driver; an optical reader for reading a printed code; or any combination of the forgoing.

The data interface module 121 is also coupled via line or bus 127 to digital code storage 129, which is preferably a programmable, non-volatile memory, for storing one or more personal identification codes. One code is stored for the primary driver, and other codes may be stored for secondary drivers, such as valets and others whose activities with the automobile are to be restricted. When the data interface module 121 receives on bus 123 a personal identification code, it compares the code to the primary code and secondary codes, if any, in digital code storage 129. If the code received from data entry device 125 matches the primary code, data interface module 121 asserts a System Enable 1 signal on line 131a; if a secondary code is matched, System Enable 2 signal on line 131b is asserted. Ports O and P on the control module 117 receive, respectively, the System Enable 1 signal and the System Enable 2 signal. If a code is to be changed, the data interface module will store a new code entered from the date entry device stored in digital code storage 129.

To permit, for example, mechanics, to operate the car, the electronic control unit 101 is turned off or overridden using by pushing a button, entering a special code or otherwise having the data entry device 125 provide a predetermined signal to the data interface module 135, but only after the primary personal identification code has been entered and matched. The data interface module then provides a data signal to the control module, for example asserting both a System Enable 1 signal and a System Enable 2 signal, that indicates to the control module 117 to override a requirement that the personal identification code be reentered once the auto ignition switch is turned off.

The data interface module 121 is also coupled to a bus 135, if the automobile is equipped with one, for the automobile's engine control module (not shown) or "ECM". Bus 135 is indicated to a SAE J-1850 bus, which is a protocol of the Society for Automotive Engineers for communications with engine control modules used in automobiles to control ignition timing, emissions and fuel injection, among other things. The invention is not limited to any particular type protocol, bus, or engine control module. The data interface module 121 is in essence a serial or parallel communications interface that passes data signals from the control module 117 to any sort of electronics that controls any automobile system, such as the ignition and fuel injection for the engine.

Other information from the control module 117 may also be transmitted by the data interface module 121 to the automobile's ECM. This information includes, optionally: an ECM enable signal, on port Q, that is provided to the data interface module on line 133a; a Mode 1 signal from port R, provided on line 133b that is asserted when a System Enable 1 signal is received at port O; and a Mode 2 signal from port S on line 133c that is asserted when the System Enable 2 signal on line 131b is asserted. The ECM enable signal provides the ability to enable the automobile's ECM after a proper code has been received by the data entry device 125. The Mode 1 and 2 signals may be used by an ECM to limit operation of the automobile, if the ECM is programmed to recognize and act on them. For example, in Mode 1, none of the functions of the automobile are limited. In Mode 2, the speed or distance travelled by the automobile is limited to a preset speed or mileage, or even time of operation.

Many of the functions of the data interface module 121 may be incorporated into the microprocessor used to handle the functions of control module 117. In particular, the microprocessor may be programmed with the function of comparing the code from the data entry device with those in the digital code storage 129. The digital code storage 129 may be a portion of the memory (if non-volatile and programmable) used by the microprocessor or microcontroller. Lines 131a–131b and 133a–133c would be, then, a flag or other standard microprocessor method for indicating or remembering an occurrence of a predetermined condition. Some or all of the communication functions may also be incorporated into the microprocessor or microcontroller, if the device incorporates, for example, a universal asynchronous receiver transmitter (UART).

Control module ports V, W, X and Y are each coupled with lines 139a–139d, respectively, to gates of field effect transistors (FETS) 137a–137d, respectively. The FETS are high-power, electronic switches for connecting the auto's solenoid circuits 103a–105c and an optional alarm circuit 140 to ground using lines 141a–141d, respectively. HEX FETS are preferred, but any other suitable switching device may be used. Each FET is turned "on" by asserting or turning "on" a port to which it is connected, permitting current to flow from the automobile's solenoids or the optional alarm circuit through the FET and to ground.

Control module port T is coupled to a serial switch 143 that is placed in a critical circuit in the automobile's engine, such as a starter wire, a spark plug wire, a coil wire or any other device that would prevent the engine's operation.

Figure 2A:
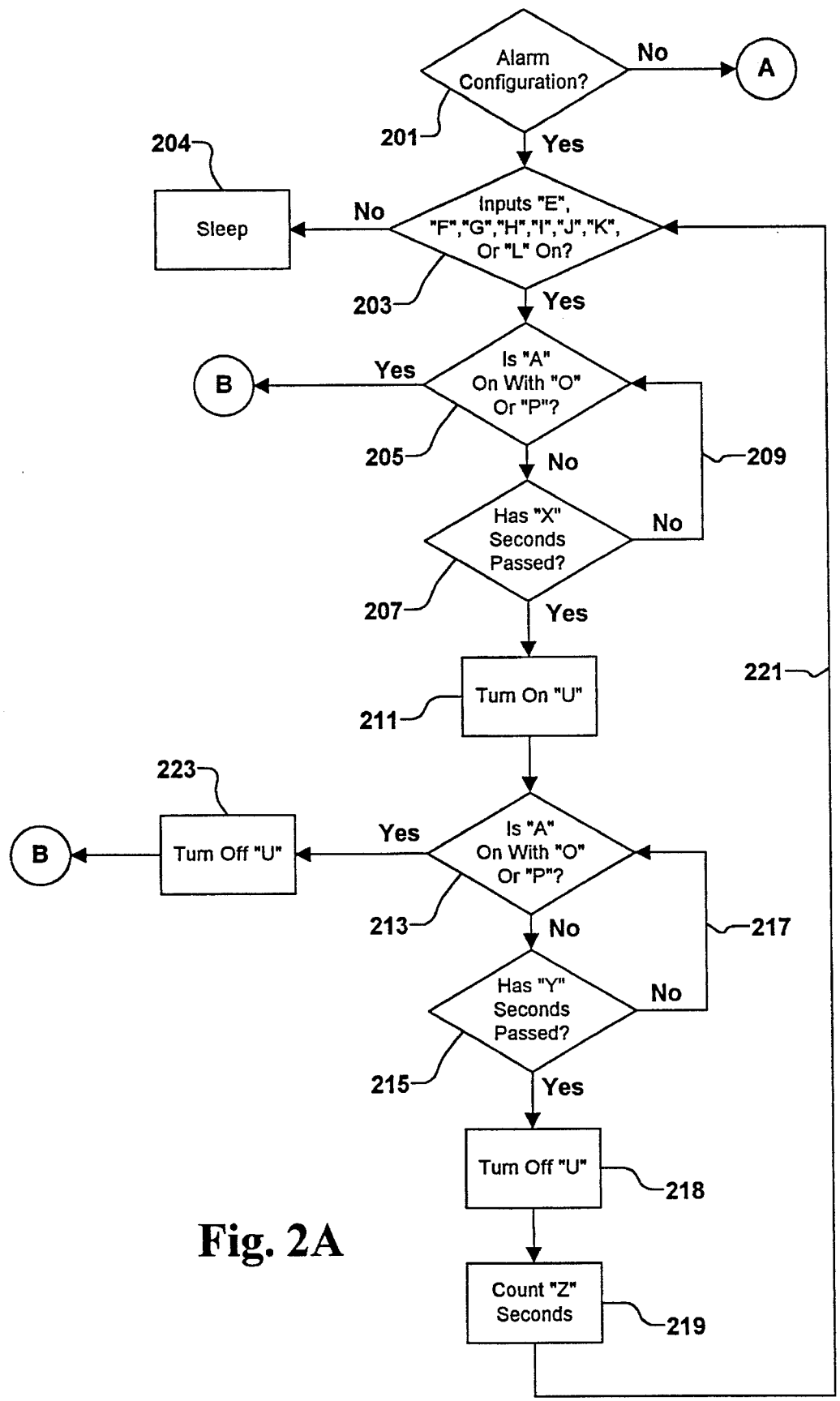
FIGS. 2A and 2B are a flow diagram of the steps of a process undertaken by the automotive security system of FIG. 1.
Figure 2B:
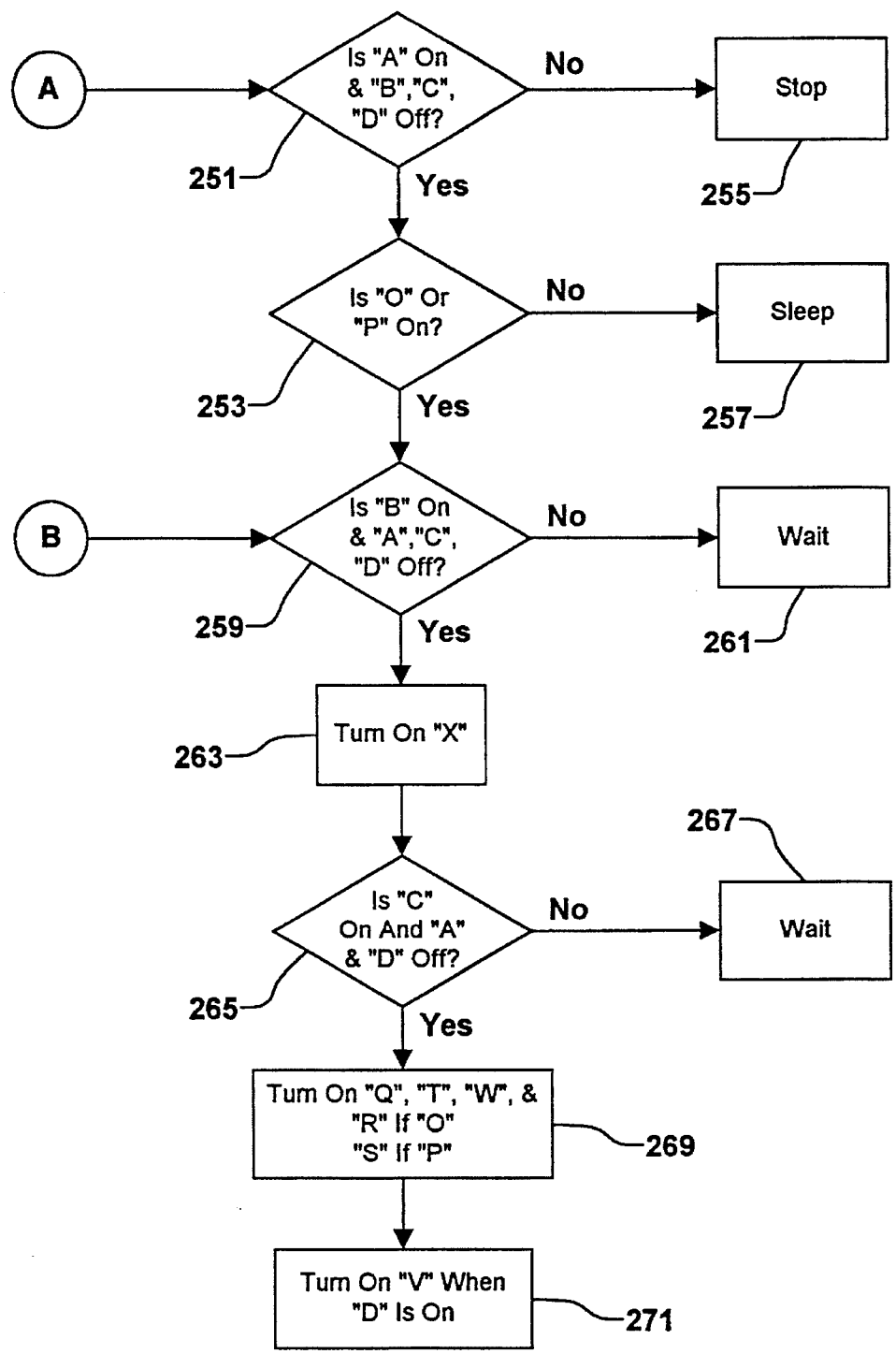

FIGS. 2A and 2B are flow diagrams of the processes of the control module 117. Referring now to FIGS. 1 and 2A together, if the automobile is equipped with an optional alarm 140, and its use is desired, the control module is configured to operate beginning first with the process shown, as indicated by decision block 201. Otherwise, as indicated by arrow "A", it moves to the process illustrated by FIG. 2B. At decision block 203, if none of the signals on ports E, F, G, H, I, J, K, or L are "on" or asserted, indicating that none of the inputs from any of the detectors for the doors, the trunk, the hood, sound and motion are on, the control module enters a "sleep" mode, as indicated by block 204. In the sleep mode, the control module remains in a standby or armed state, waiting for an input line to be asserted on ports E to L. None of the FETs 137a–137d are enabled and none of the lines 133a–133d are asserted.

Once any of the signals on ports E to L are asserted, the control module 117 looks to see if, as indicated by decision block 205, whether the "OFF" signal from the auto ignition switch 103 on port A is on, together with either System Enable 1 signal on port O or System Enable 2 signal on port P. As indicated by decision block 207 and return loop 209, "x" seconds are given to satisfy this condition. The condition requires that both the auto ignition switch remains in the "OFF" position while a permitted personal identification code is entered. The control module process, as indicated by arrow "B", proceeds to that shown in FIG. 2b, beginning with arrow "B", if this condition is satisfied within "x" seconds. If the condition is not satisfied with "x" seconds, port U is turned "on" by the control module, indicated by block 211, which in turn enables the FET 137d to complete the power circuit to the alarm 140 for the alarm to sound.

After the alarm is turned on, the control module looks again at ports A, O, and P for signals indicated that A and either O or P are asserted, as indicated by decision block 213. This continues "Y" seconds, as indicated by decision block 215 and loop 217. If A and either Q or P are not asserted within "Y" seconds, port U is turned "off", shown by block 218, turning off the alarm. The alarm is turned off after a time in which a thief will probably have fled after attempting to steal the car. This prevents the alarm from becoming a nuisance if no one is around to turn it off.

As indicated by block 219 and return loop 221, the control module waits the predetermined time, "Z seconds", before returning to the step of decision block 203 of monitoring ports E to L. This time period prevents the alarm sequence from immediately reoccurring, providing time to correct the event or condition that triggered the alarm.

If A and O or P are asserted while the alarm is sounding, within the "y" seconds, as represented by decision block 213, port U is turned off, indicated by block 223, turning off the alarm. The process of the control module then moves, as indicated by arrow "B" to, the process illustrated in FIG. 2b, beginning at arrow "B".

Referring now to FIGS. 1 and 2B together, if not configured for an alarm, the control module 117 carries out, as indicated by arrow "A", steps represented by decision blocks 251 and 253, before continuing with the process steps hereinafter described.

The control module continually polls ports A to D for asserted signals (logic low) from the auto ignition switch 103, as well as ports O and P for System Enable 1 and 2 signals. As shown by decision blocks 251, 253 and "sleep" block 257, if port A is on and ports B, C and D are off, the control module enters a "sleep" or standby state until it receives a System Enable 1 or 2 signal on ports O or P, indicating that an acceptable personal identification code has been provided by the data entry device 125. Otherwise, if port A is off and B, C and D are off, or if port A is on along with B, C and/or D, the auto ignition switch is not properly working, indicating that a thief is tampering with it. The control module enters a "stop" state, shown by block 255, in which the control module will not assert or turn on any output port O to X that would enable operation of the automobile.

When ports P or O are turned on by a correct code has being entered by data entry device 125 to enable operation of the control module, the control module exits the sleep mode and begins a process that is carried out in either the alarm or no alarm configuration. Arrow "B" indicates the point at which the process depicted in FIG. 2A joins.

Then, as indicated by decision block 259, the control module checks to see if port B is "on" (assertion of the ACC signal from the auto ignition switch 103) while ports A, C and D are off (OFF, ON and START lines are not asserted from auto ignition switch). As indicated by block 261, the control module enters a wait state in which it waits for this condition to be satisfied. Once port B is turned on, the control module turns on port X, which turns on FET 137a to connect the ACC solenoid of the automobile to ground to complete a circuit.

Next, the control module, at decision block 265, checks port C to see if the ON signal from the auto ignition switch 103 is asserted and port D, connected to the START position of the auto ignition switch, is off. As indicated by wait state block 267, the control module waits until this condition is satisfied. Then, as shown in block 269, the control module turns on or asserts a signal on port W, which turns on FET 137b to enable the automobile's ON solenoid circuit. As further described in block 269, ports Q and T are turned on, providing an ECM enable signal to the data interface module 121 for transmission to the ECM on bus 135, and closing the serial switch 143. And, either port R or S is turned on to provide a Mode 1 or Mode 2 signal to the data interface module 121 for transmission to the ECM, depending on whether the System Enable 1 signal is received (port O on) or the System Enable 2 signal in received (port P on). The Mode 1 or the Mode 2 signal is then used by the ECM to determine the mode of operation of the automobile, i.e. whether its operation should be limited in some manner because of the driver.

Finally, as indicated by block 271, the control module asserts port W to turn "on" FET 137c for as long as the START signal is asserted on port D. This completing the solenoid circuit for the starter of the automobile Port W is then turned off when the START signal on port E is no longer asserted. In sum, if the ignition switch does not go through the proper start up sequence after entry of a proper personal identification code, the automobile cannot be started.

The ports T, W and X remain on so long as the ignition switch remains in the on position. Once the ignition switch is turned to ACC, ports T and X are turned off. When the ignition switch is turned to the OFF position, ports T, W and X are turned off, if not already off, and the control module enters a sleep state, at block 257, in which it monitors ports A to D and O and P. If the condition in decision block 251 is not satisfied, it will enter the stop state, shown by block 255.

Figure 3:
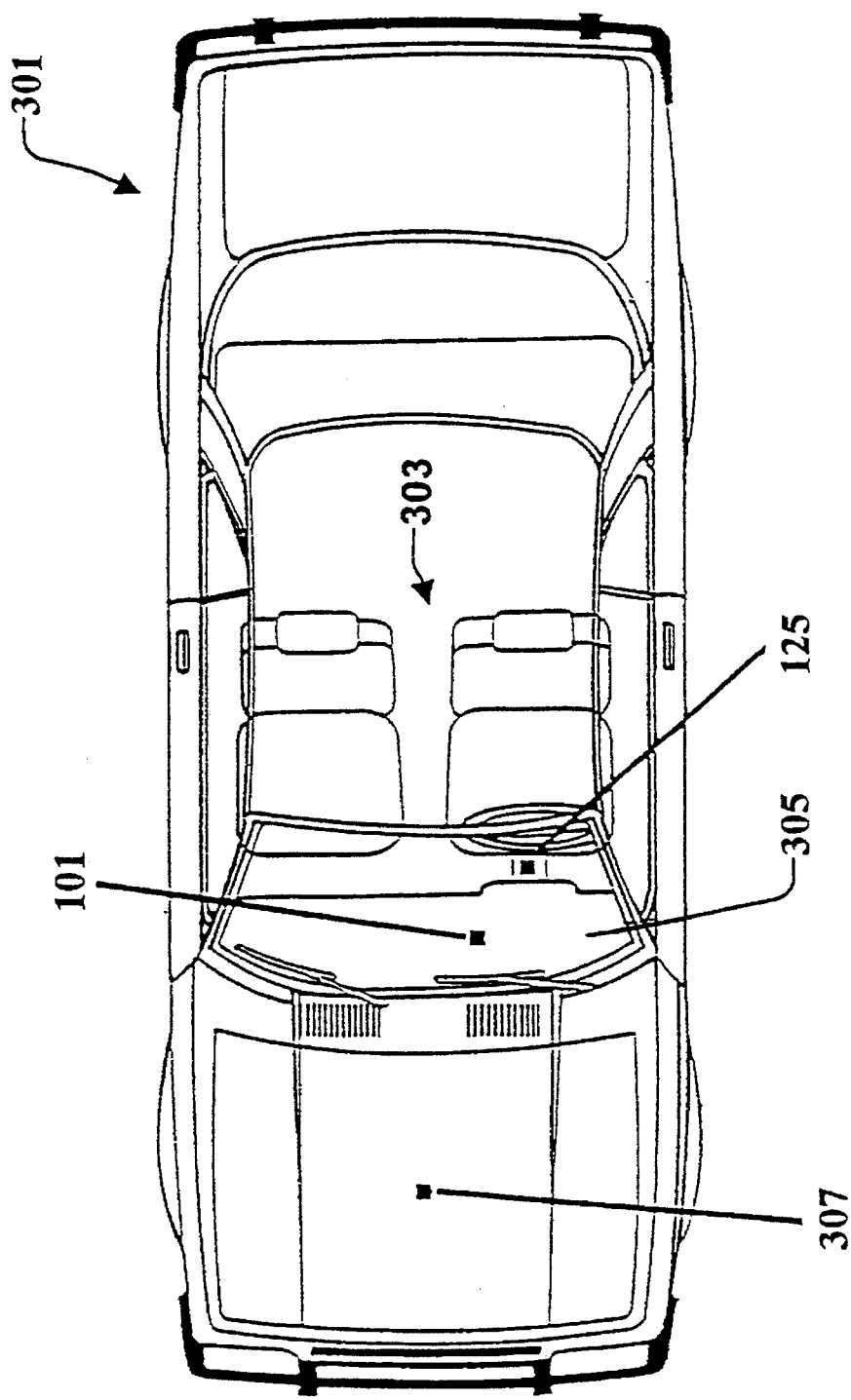
FIG. 3 is a schematic overview of an automobile in which there is indication of the placement of components of the automotive security system of FIG. 1.

Referring now to FIG. 3, shown in schematic representation is an automobile 301. Placed near the driving position 303 is a data entry device 125. The control module is placed under the dash 305, near the auto ignition switch (not shown) typically mounted near the point at which the steering column (not shown) passes through the floor board. This is the point at which the auto ignition wires are available for connecting to the control module, and at which it would be difficult for a potential thief to "hot-wire" the car in a short amount of time, thus discouraging theft. Serial switch 307 is placed in a critical electrical engine circuit to complicate further any attempts to overcome the system.

Although described in its preferred embodiment as an "after-market" automobile anti-theft device, those in the art will recognize that the invention may be incorporated into an automobile's electronics as original equipment, either as a separate module or as part of an engine control module by incorporating the processes of the control module 117 (FIG. 1).

Only the preferred embodiments and best mode for carrying out the invention have been described. It will be apparent, however, to a person having ordinary skill in the art of the invention that various modifications to the embodiments shown and described may be made without departing from the scope of the embodiments of the invention as set forth in the claims and equivalent embodiments.

We claim:

1. Apparatus for deterring defeat of a multiple-position ignition switch of an automobile, the ignition switch adapted for turning successively through each of a plurality of positions in a predetermined sequence, each position enabling a respective one of a plurality of circuits in the automobile; the apparatus comprising:

means for receiving from a driver a numerical code;

means for matching the numerical code to a preset code and communicating a match signal indicative of a match; and control means having a plurality of inputs each receiving from a respective one of a plurality of positions of a multiple-position automobile ignition switch a switch signal indicative of the position, and further having an output for providing a signal for enabling a circuit necessary for operation of the automobile;

wherein the control means includes means for generating the signal for enabling the circuit necessary for operation of the automobile in response to receiving the match signal and receiving the plurality of switch signals in a predetermined sequence, indicating that the switch signals are being produced by turning of the ignition switch through each of the plurality of positions in a predetermined sequence.

2. The apparatus of claim 1 wherein the circuit necessary for operation includes an engine control module for the automobile.

3. The apparatus of claim 1 wherein the circuit necessary for operation of the automobile includes a starter circuit for an engine.

4. The apparatus of claim 3 wherein the control means further includes a second output for enabling an ignition circuit of the automobile, the control means enabling the ignition circuit in response to first receiving the match signal and then receiving another one of the switch signals indicating that the ignition switch has been turned in the predetermined sequence through at least one of the plurality of positions to an "on" position prior to receiving ignition switch signals indicating that the ignition switch has been turned to a "start" position.

5. The apparatus of claim 4 wherein the ignition switch further includes an "off" position and an "accessories" position and the control means further includes a third output for enabling an accessories circuit of the automobile in response to first receiving the match signal and then receiving ignition switch signals in a sequence indicating that the ignition switch is in the "accessories" position and not in the "off," "on" or "start" positions.

6. The apparatus of claim 1 wherein;

the means for matching further matches the received code to a second preset code and communicates a second match signal indicative of a match with the second preset code to the control means; and the control means further includes a second output for signalling to an engine control, after receiving ignition switch signals in the predetermined sequence, a first signal for enabling a first mode of operation in response to receiving the first match signal and a second signal for enabling a second mode of operation of the automobile in response to receiving the second match signal.

7. The apparatus of claim 1 wherein the means for matching and the control means are enclosed in a housing for mounting in an automobile and for interconnection in series between the key ignition switch and the circuit necessary for operation of the automobile.

8. The apparatus of claim 1 wherein the control means includes a programmable microcontroller.

9. The apparatus of claim 1 wherein the means for receiving includes a keypad for manually entering the numerical code.

10. The apparatus of claim 1 wherein the means for receiving includes means for detecting the numerical code encoded on a signal broadcast by the driver.

11. Apparatus for deterring defeat of a multiple-position ignition switch of an automobile comprising:

an automobile having a plurality of circuits, each circuit including means for completing the circuit in response to receiving a control signal;

a multi-position ignition switch for turning successively through each of a plurality of positions corresponding to each of the automobile circuits in a predetermined sequence, the ignition switch, when turned to each position, asserting a switch signal for enabling completion of the corresponding one of the plurality of circuits;

means for receiving from a driver a numerical code;

means for matching the numerical code to a preset code and communicating a match signal indicative of a match; and control means having a plurality of inputs, each input receiving from a different one of the plurality of positions the respective switch signal, and further having an output for sending a control signal for enabling one of the plurality of circuits necessary for operation of the automobile;

wherein the control means includes means for generating the control signal only in response first to receiving the match signal and then to receiving at its respective inputs each of the plurality of switch signals in a predetermined sequence, indicating that the switch signals are being asserted by turning of the ignition switch through each of the plurality of positions in a predetermined sequence.

12. The apparatus of claim 11 wherein the one of the plurality of circuits necessary for operation includes an engine control module for the automobile.

13. The apparatus of claim 11 wherein the one of the plurality of circuits necessary for operation of the automobile includes a starter circuit for an engine.

14. The apparatus of claim 12 wherein the control means further includes a second output for sending a second control signal for enabling an ignition circuit of the automobile, the control means enabling the ignition circuit in response to first receiving the match signal and then receiving switch signals in a sequence indicating that the ignition switch has been turned in the predetermined sequence through at least one of the plurality of positions to an "on" position prior to receiving the switch signal indicating that the ignition switch has been turned to a "start" position.

15. The apparatus of claim 13 wherein the ignition switch further includes an "off" position and an "accessories" position and the control means further includes a third output for sending a third control signal for enabling an accessories circuit of the automobile in response to first receiving the match signal and then receiving switch signals in a sequence which would indicate that the ignition switch has been turned from an "off" position to the "accessories" position and that the ignition switch is not in the "off," "on" or "start" positions.

16. The apparatus of claim 11 wherein
the means for matching further matches the received code to a second preset code and communicates a second match signal indicative of a match with the second preset code to the control means; and
the control means further includes means for signalling to an engine control module for enabling, after receiving ignition switch signals in the predetermined sequence, a first mode of operation in response to receiving the first match signal and a second mode of operation of the automobile in response to receiving the second match signal.

17. The apparatus of claim 11 wherein the means for matching and the control means are enclosed in a housing for mounting in an automobile and for interconnection in series between the key ignition switch and the circuit necessary for operation of the automobile.

18. The apparatus of claim 11 wherein the control means includes a programmable microcontroller.

19. The apparatus of claim 11 wherein the means for receiving includes a keypad for manually entering the numerical code.

20. The apparatus of claim 11 wherein the means for receiving includes means for detecting the numerical code encoded on a signal broadcast by the driver.

21. Apparatus for deterring defeat of a multiple-position ignition switch of an automobile the automobile including a multi-position ignition switch for turning successively through each of a plurality of positions corresponding to each of a plurality of automobile circuits in a predetermined sequence, the positions including "off," "accessory," "on" and "start," the switch in each position generating a predetermined switch signal; the apparatus comprising:
means for receiving from a driver a numerical code;
means for matching the numerical code to a preset code and communicating a match signal indicative of a match; and
control means having a plurality of inputs corresponding to each position of the automobile's ignition switch, each input receiving, respectively, a signal switch indicating "off," "accessory," "on" and "start" positions of the ignition switch; the control means further having an output for sending a control signal for enabling a circuit necessary for operation of the automobile;
wherein the control means includes means for generating the control signal in response first to receiving the match signal and subsequently detecting at its respective inputs assertion of the switch signals in a predetermined sequence as follows: first, "off" is asserted and all other switch signals are unasserted; second, "accessories" is asserted and all other switch signals are unasserted; third, "accessories" and "on" are asserted and "off" and "start" switch signals are unasserted; and fourth, "accessories," "on" and "start" are asserted and "off" is unasserted.

* * * * *